United States Patent [19]

Wright

[11] 4,125,321

[45] Nov. 14, 1978

[54] APPARATUS FOR PROJECTING LIGHT IMAGES

[76] Inventor: Edward E. Wright, 6431 Glenroy, San Diego, Calif. 92120

[21] Appl. No.: 747,669

[22] Filed: Dec. 6, 1976

[51] Int. Cl.² .................. G03B 21/26; G03B 21/14
[52] U.S. Cl. ...................................... 353/44; 353/30; 353/84; 353/94; 353/DIG. 3
[58] Field of Search ................. 353/30, 31, 44, 46, 353/48, 50, 51, 62, 84, 94, 122, 121, DIG. 3, DIG. 5; 40/106.52; 35/66, 61, 62, DIG. 3, 19; 346/21

[56] References Cited

U.S. PATENT DOCUMENTS

| 1,545,674 | 7/1925 | MacKay | 353/44 |
| 1,579,597 | 4/1926 | Craig | 353/46 |
| 1,626,841 | 5/1927 | Kelley et al. | 353/84 |
| 1,939,597 | 12/1933 | Merrill | 353/30 |
| 3,055,113 | 9/1962 | Grandjean | 33/18 R |
| 3,104,273 | 9/1963 | Ballance | 35/DIG. 3 |
| 3,437,401 | 4/1969 | Siksai | 40/106.52 X |
| 3,472,587 | 10/1969 | Liguori | 353/DIG. 3 |
| 3,541,705 | 11/1970 | Nelson | 353/44 X |
| 3,835,307 | 9/1974 | Johnston | 350/4.2 |
| 3,998,535 | 12/1976 | Clarke | 353/84 |
| 4,067,111 | 1/1978 | Truitt | 33/27 L |

Primary Examiner—Harry N. Haroian
Attorney, Agent, or Firm—R. S. Sciascia; G. J. Rubens

[57] ABSTRACT

An apparatus for projecting images simulating the phenomenon of combustion on a display media is provided with a control means for quickly positioning, expanding, and diminishing the images. Light from a light source is passed through orange and grey translucent filter segments, a light dispersal means, and an animating means to project animated orange and grey light images upon the media, the orange light representing the flame component of combustion and the grey light representing the smoke component. The control means comprises a transparent tray situated between the dispersal means and the display media which is overlaid with opaque or translucent particulate material which may be cleared by the finger of an operator or the like from a small area at a selected position on the tray surface to project an image at a corresponding position on the media, the dimensions of the projected image corresponding to the dimensions of the cleared area.

11 Claims, 3 Drawing Figures

APPARATUS FOR PROJECTING LIGHT IMAGES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein relates generally to a means for controlling projected light images, and more particularly to a means for readily varying the positions and dimensions of animated colored light images projected onto visual display media.

Apparatus for visually representing the phenomenon of combustion by providing animated images of smoke and flame have been found to be quite useful for numerous training, demonstrative, and other purposes. For example, in classroom training for firefighters, an instructor may employ such means to simulate a tactical problem by selectively projecting flame and smoke images on a visual representation of a building or other environment where fire can occur, the animation of the images providing a heightened sense of realism or urgency.

While some devices are presently available for such simulations, they may employ cumbersome or awkward means of adjustment. In some such devices, for example, a glass overlaid with carbon paper is positioned between a light source and display screen, and to project an image representing combustion at a selected position on the screen, an amount of carbon paper must be scraped away from a corresponding position on the glass, allowing light to pass through to the screen. However, if a user of the device miscalculates the position on the glass, he must make adjustment by first covering the scraped area with black paint and then scrape the carbon paper from a second area. Such means of adjustment may be inhibiting in classroom training for firefighters if it is desired to make rapid variations in the displayed images of combustion in order to simulate a sudden change in the nature of a tactical problem, or to demonstrate the manner in which a fire situation responds to various acts of fire control. In addition, presently available devices may require the use of at least two separate light sources, one to project a flame image and another a smoke image, and may comprise structure which is expensive, bulky, and unadaptable for other purposes.

SUMMARY OF THE INVENTION

In its broadest conception, the invention disclosed herein provides a simplified and convenient light value, or light control means, for controlling the projection of light, and particularly for controlling the positions and dimensions of light images projected onto visual display media. In the invention a tray comprising a substantially flat transparent or translucent member is positioned between a source of light and the display media, and a surface of the tray is overlaid with loose particulate material which is opaque or substantially impervious to light. By clearing the particulate material from selected areas of the tray surface, light beams from the light source are allowed to pass therethrough to project selected light patterns or images onto selected area of the display media, the dimensions of the images and their positions on the display media varying in accordance with the dimensions and positions of the cleared areas. An animating means, which preferably comprises a rotating configuration of grid segments, may be situated in relation with the aforesaid light source, display media, and overlaid tray to provide an animated effect to the projected light images, and colored filter means or other coloring elements may be situated between the light source and the display media to provide light images of selected colors.

In one embodiment of the invention, the overlaid tray, animating means, and filter means are situated in cooperative relationship in a very compact and transportable structure which may be employed with a standard overhead projector to generate a selected set of animated and colored light images. In another embodiment of the invention, the overlaid tray, animating means, and filter means may each be provided as a removable accessory for a structure which may be used for any purpose which commonly requires the employment of a standard overhead projector. Embodiments of the invention may be used to provide a visual simulation of combustion for training or for other purposes, although it is not intended to limit the invention to such simulation or for such purposes.

OBJECTS OF THE INVENTION

It is a primary object of the present invention to provide a simplified and inexpensive means for making spatial and dimensional adjustments of light images projected onto a display media.

Another object of the present invention is to provide a new and improved means for displaying images or patterns of light which appear to be animated or in continual motion and which may be of selected color, the positions and dimensions of such images in relation to a display media being readily controllable.

Another object of the present invention is to provide a new and improved visual training device for training firefighting personnel.

Another object of the invention is to provide a new and improved means for visually representing the phenomenon of combustion on a display of media wherein the representations may be quickly and conveniently varied.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
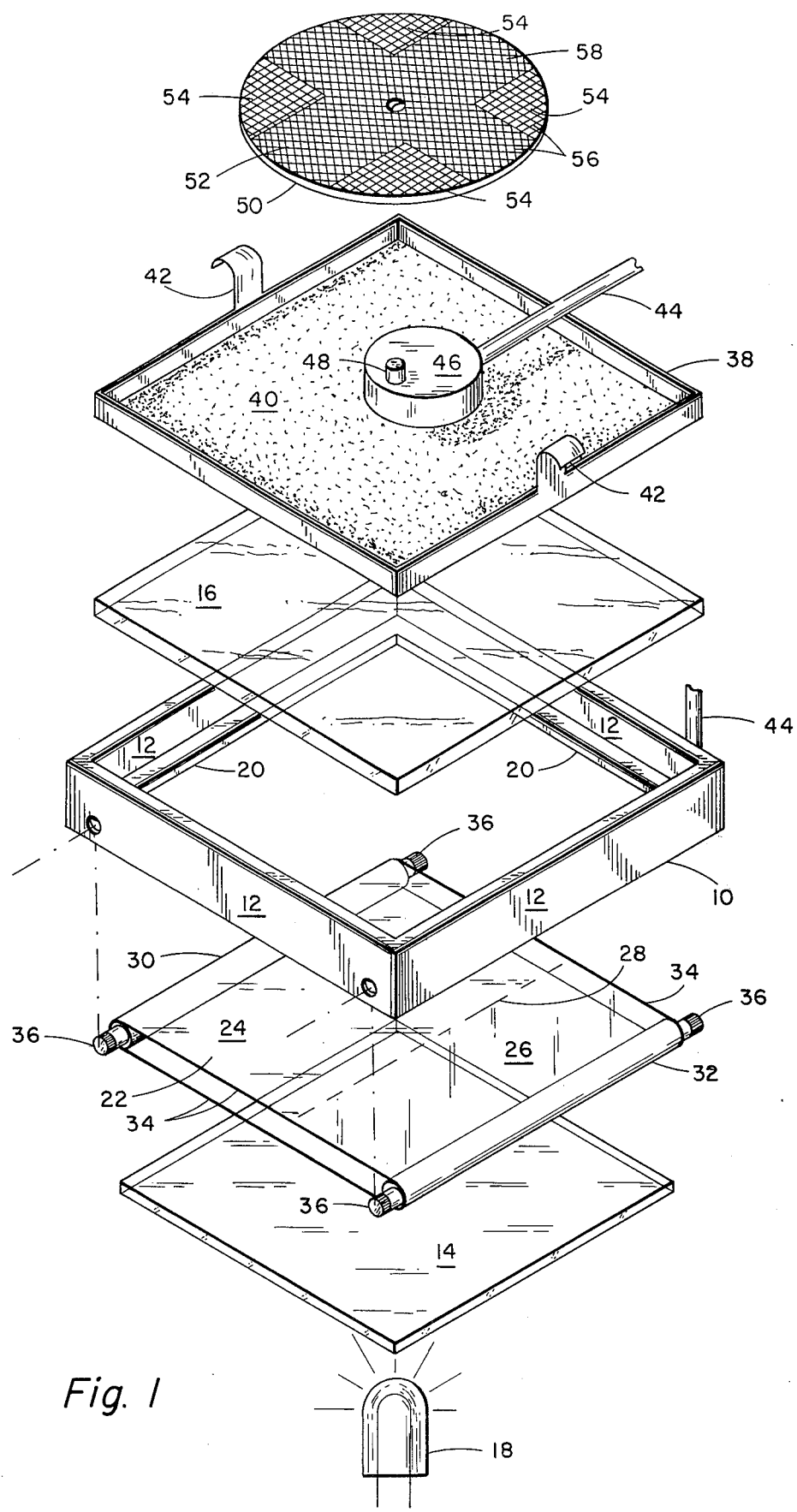
FIG. 1 shows an exploded view of an embodiment of the invention.

Referring to FIG. 1, there is shown base 10 comprising rectangular-shaped side members 12, each side member 12 being joined to adjacent side members in orthogonal relationship. Base 10 fixably holds filter support 14 and light dispersal means 16 in horizontal disposition, means 16 being spaced above filter support 14 and light source 18 being situated beneath base 10 to project light upward therethrough. Filter support 14 comprises a rectangular-shaped member of transparent material such as butyral and has substantially flat upper and lower surfaces so that light from source 18 may pass therethrough without being scattered or dispersed. Light dispersal means 16 is mounted within ledge 20, which is affixed to side members 12, and comprises a rectangular-shaped member of transparent material such as Plexiglass, the upper surface thereof being textured or uneven to scatter or disperse light passing upward through base 10 from source 18.

Divided filter 22 is formed of flexible transparent material and comprises filter segments 24 and 26 which are divided by line 28. Segment 24 is overlaid with a translucent orange or reddish-orange substance, whereby only light of orange or reddish-orange wavelengths may pass therethrough, to provide light images representing the flame component of combustion. Similarly, segment 26 is overlaid with a translucent substance of grey coloration to provide light images representing the smoke component of combustion. Segments 24 and 26 are respectively attached along rollers 30 and 32 and are wrappable therearound, rollers 30 and 32 being rotatably attached to base 10. Rollers 30 and 32 are respectively positioned in relation to filter support 14 so that a portion of divided filter 22 lies thereupon and is supported thereby, whereby line 28 may be moved transversely across the surface of filter support 14 by rotating rollers 30 and 32. O-rings 34, comprising donut-shaped rubber material, are stretched between ends of rollers 30 and 32 to serve as a common belt drive therefore, whereby the rotations of rollers 30 and 32 are made uniform. Knobs 36 are affixed to the ends of the rollers to allow manual rotation thereof in order to vary the position of line 28 in relation to filter support 14, and thereby to vary the respective amounts of orange and grey light projected upward through base 10. It may be noted that by employing a filter divided into segments of orange and grey coloration, only one light source is required to illustrate both smoke and flame images.

The light from source 18 which passes upward through filter support 14, divided filter 22, and light dispersal means 16 may be projected onto a display screen (not shown in FIG. 1) to display light images of orange, grey, or a combination of orange and grey coloration which comprise mottled light patterns, or irregular intermixtures of lighter and darker areas, the mottling effect being produced by passing the light through light dispersal means 16. To selectively control the positions and dimensions of these light images upon the display screen, particle tray 38, which has an amount of loose particulate or granular material 40 placed upon its upper surface, may be interposed between dispersal means 16 and the display screen. Tray 38 comprises a rectangular-shaped member of transparent material such as butaryl having the same dimensions as dispersal means 16 and may be placed thereover and supported thereupon. Alternatively, tray 38 may be supported over dispersal means 16 by hooking handles 42 of tray 38 over upper edges of side members 12. The particulate material 40 may be any suitable substance, such as table salt, which is opaque or substantially impervious to light whereby, if the upper surface of tray 38 is entirely covered with particulate material, none of the light passing upward through base 10 will be projected onto the display screen although some light can be transmitted therethrough for a purpose later to be described. Alternatively, if particulate material is cleared from a small area at a selected position on the surface of tray 38, a light image will appear on an area of the display screen at a position corresponding therewith, the dimensions of the image bearing direct relationship to the dimensions of the cleared area. It will be readily apparent that simply by brushing the particulate material 40 with a finger or by manipulating it in any other manner, mottled light images of orange, grey and combinations of orange and grey coloration may be positioned, repositioned, expanded and diminished on the display screen.

Referring further to FIG. 1, there is shown bracket 44 which is attached in any suitable manner to base 10 to fixably retain motor 46 above base 10, motor 46 being designed and geared to rotate a shaft 48 projecting upward therefrom at a constant speed of 6-7 RPM. Circular disc 50 is provided with an aperture in its center of such dimension that it may be fixalby mounted on shaft 48 and rotated thereby at the same speed of rotation, 6-7 RPM. Disk 50 comprises grid segment 52 to which are joined grid segments 54, each grid segment being formed of opaque grid lines 56 with transparent spaces 58 therebetween, and has the particular configuration shown in FIG. 1 for purposes hereinafter described. Disk 50 is positioned by bracket 44 and motor 46 in such relation with tray 38 that any light beams passing upward through a cleared area on tray 38 is intersected by grid lines of disk 50, whereby the light beams may produce images which appear to be animated or in continual motion.

Figure 2:
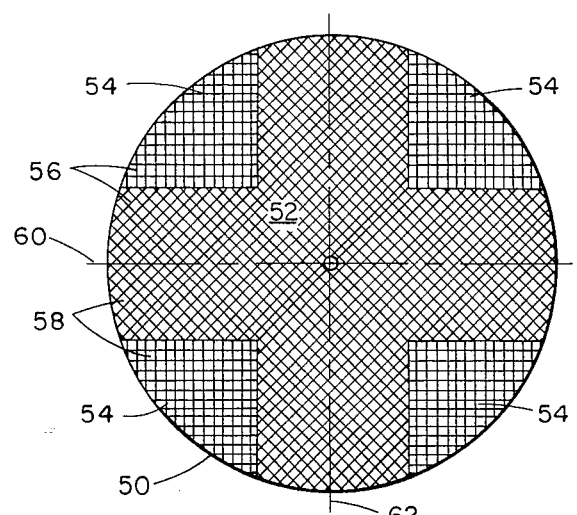
FIG. 2 shows an animating means which may be employed in the embodiment of FIG. 1.

Referring to FIG. 2, there is shown disk 50 with orthogonal axes 60 and 62 superimposed thereon. Some of the opaque grid lines 56 which form grid segment 52 are oriented at 45 degrees with axis 60, and the remainder of the grid lines 56 forming segment 52 are oriented at 45° with axis 62. Some of the grid lines 56 forming each of the grid segments 54 are parallel to axis 60, and the remainder of the grid lines 56 forming the grid segments 54 are parallel to axis 62. By constructing disk 50 of opaque grid segments of such configuration, a light beam passing upward from the base 10 will be intersected by grid lines at an angle of 45°, preventing a moving bar effect in the displayed light images.

Figure 3:
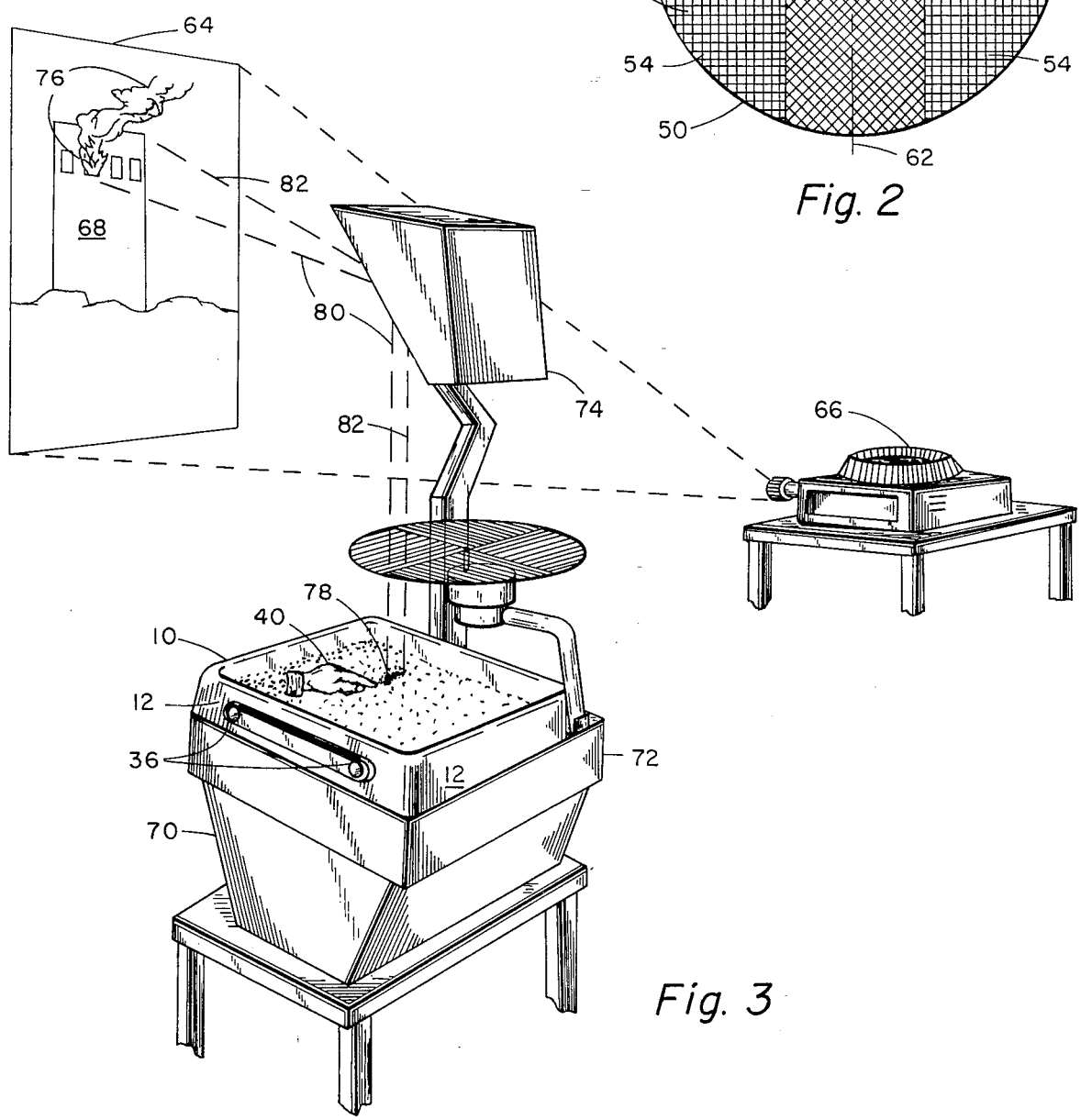
FIG. 3 shows the embodiment of FIG. 1 situated in operative relationship with an overhead projector, a slide projector, and a projection screen.

Referring to FIG. 3, there is shown a display screen 64, such as a slide projection screen, and a slide projector 66 projecting thereon a visual representation of a building or other structure 68, in which combustion may occur. There is further shown the embodiment of the invention hereinbefore described situated in operational relationship with a standard overhead projector, the basic elements of which comprise a projector base 70 containing a light source 18, a light converging means 72 such as a Fresnel lens, and a focusing means 74.

To display a visual representation of combustion on a selected area 76 of display screen 64, particulate material 40 is cleared from a small area 78 of tray 38, whereupon light beams 80 and 82 may pass upward, as previously described, to focusing means 74, which may be adjusted to project beams 80 and 82 upon the area 76. Light beam 80 comprises light from source 18 which passes through the orange filter segment 24 to provide an image of flame, and beam 82 is a light beam passing upward through grey filter segment 26 to provide an image of smoke, line 28 being positioned beneath area 78 by means of knobs 36. However, because of the light dispersing effect of light dispersal means 16, flame and smoke images will not appear to be sharply divided along a straight line even though filter segments 24 and 26 are so divided.

To enable a projectionist to quickly determine an area 78 on tray 38, tray 38 may be programmed before particulate material 40 is placed thereon by making light removable marks at positions on tray 38 which correspond to the positions of areas 76 on screen 64. If a particulate material such as salt is then placed over the tray, the marks will be visible to the projectionist without effecting light image display.

In a modification of the invention, divided filter 22 may comprise segments of colors other than grey or orange. Such modification may be employed, for example, to represent a chemical fire, which may have a flame component appearing to be blue or green, or to represent any other phenomenon which appears to be animated and of a distinctive color.

In a further modification, divided filter 22 may include a transparent filter segment which may be positioned so that all of the light passing upward through base 10 passes therethrough. Cleared areas 78 on tray 38 may then be stained with translucent substances of orange, grey, or other colors to project desired light images onto any selected areas 76 of screen 64.

Obviously many modifications and variations of the present invention are possible in the light of the above teachings. It is therefore to be understood that within the scope of the appended claims the invention may be practiced otherwise than as specifically described.

What is claimed is:

1. An apparatus for controlling light images projected onto a display media by a source of light, said apparatus comprising:
    a. an open tray member having a transparent surface capable of transmitting light positioned between said source and said display media;
    b. a layer of loose particulate material freely supported upon the upper surface of said member, said particular matter being displaceable from one area on said surface to another area on said surface to enable selected areas on said surface to be cleared of the particulate matter to allow light from said source to pass through said areas and be projected on said display media to simulate desired images;
    c. said particulate material being capable of transmitting sufficient light to allow indicia marked on the member to be visible to an operator through the particulate material to guide the operator in clearing the particulate material from said selected areas.

2. A single-projector fire training apparatus for projecting selected light images onto display media to simulate components of combustion comprising:
    a. an enclosure containing a light converging means; and
    b. a light source positioned to project light through said light converging means;
    c. a light focusing means positioned above the enclosure to selectively focus light passing through said light converging means onto said display media;
    d. a light control means having a transparent surface positioned between the light source and the focusing means;
    e. a layer of loose particulate material freely covering said surface and being readily displaceable from one area on said tray to another area, said particulate material having the properties of common table salt in that a sufficient amount of light can be transmitted therethrough to allow indicia marked on the control means to be visible to the operator;
    f. a filter means positioned between the light source and the light control means,
    g. an animating means positioned between the light control means and the light focusing means; and
    h. a light dispersal means positioned between the filter means and the light control means;
    whereby the loose particulate material can be cleared from selected areas to allow the light to be projected therethrough to simulate desired images on the display media.

3. The apparatus of claim 2 having removable guide lines on said transparent surface visible to the operator through said particulate material for guiding the operator in clearing the particulate material from said selected areas.

4. The apparatus of claim 3 wherein the said filter means comprises a selected number of contiguous translucent filter segments of selected colors representing smoke and fire, each of said segments being movable in relation to said light control means for alignment with the selected cleared areas.

5. The apparatus of claim 4 wherein said animating means comprises a rotatable disc having a plurality of grid segments, each of said grid segments formed of a plurality of spaced opaque grid lines, some of said grid lines being oriented at 45° to a pair of orthogonal axes in a cruciform configuration, and some of said grid lines being oriented in parallel relation to said axes.

6. The apparatus of claim 5 wherein said light dispersal means comprises transparent material having a textured surface.

7. An improved visual display system of the type wherein a first projection means projects a selected visual representation onto display media, and a second single projection means containing a light source is provided to selectively project light images to be superimposed onto the visual representation on said display media, wherein the improvement comprises:
    a. a light control means provided with an open transparent support containing a layer of loose freely displaceable particulate material, said particulate material having the properties of common salt in that a sufficient amount of light can be transmitted therethrough to allow indicia marked on the control means to be visible to the operator;
    b. a filter means positioned between the light source and the light control means;
    c. an animating means positioned between the light control means and the display media;
    d. a light dispersal means for diffusing the light from the light source; whereby the loose particulate material can be cleared from selected areas to allow the light to be projected therethrough to simulate desired images on the display media.

8. The improvement of claim 7 wherein the transparent support of said light control means is an open tray having lifting handles to enable the tray to be vibrated readily to redistribute the particulate material evenly over the entire surface for the start of a new training session.

9. A single projector apparatus for projecting selected light images onto display media comprising:
    a. a light source spatially displaced from said display media;

b. a light control means having a transparent surface supported between the light source and the display media;

c. a layer of loose particulate material covering said surface and being freely displaceable from one area of said surface to another area on said surface;

whereby the loose particulate material can be cleared from selected areas to allow the light to be projected therethrough the simulate desired images on the display media;

a rotatably animating means positioned between the light control means and the display medium, said animating means comprising a plurality of adjacent grid segments, each of said grid sgements formed of spaced opaque grid lines; a portion of some of said grid lines being oreinted at 45 degrees to a pair of orthogonal axes and a portion of some of said grid lines being oriented in parallel relation to said axes.

10. A method of controlling the size and character of light images to be projected for a visual training display from a single projector comprising:

the step of depositing an amount of loose and freely displaceable particulate material on top of a light transmitting support member, vibrating the support member to distribute the particulate material as a layer over the entire member; and displacing the particulate material on top of the support member to provide clear selected areas to simulate the desired projected images;

programming the support member with removable lines for guiding the operator in determining the selected areas to be cleared.

11. A single projector apparatus for projecting selected light images onto display media comprising:

a. a light source spatially displaced from said display media;

b. a light control means having a transparent surface supported between the light source and the display media;

c. a layer of loose particulate material covering said surface and being freely displaceable from one area of said surface to another area on said surface;

whereby the loose particulate material can be cleared from selected areas to allow the light to be projected therethrough to simulate desired images on the display media; filter means being positioned between the light source and the light control means; said filter means having contiguous translucent segments of selected colors to simulate fire and smoke; and filter is movable between spaced rollers in relation to said light control means and means if provided for rotating said filter means to vary the position of the transulcent segments with respect to the media.

* * * * *